No. 779,169. PATENTED JAN. 3, 1905.
J. H. MacDONALD.
CEMENT PIPE.
APPLICATION FILED JULY 20, 1904.

No. 779,169. Patented January 3, 1905.

UNITED STATES PATENT OFFICE.

JAMES H. MacDONALD, OF NEW HAVEN, CONNECTICUT.

CEMENT PIPE.

SPECIFICATION forming part of Letters Patent No. 779,169, dated January 3, 1905.

Application filed July 20, 1904. Serial No. 217,367.

*To all whom it may concern:*

Be it known that I, JAMES H. MACDONALD, a citizen of the United States, residing at New Haven, in the county of New Haven and State of Connecticut, have invented a new and useful Improvement in Cement Pipes; and I do hereby declare the following, when taken in connection with the accompanying drawings and the numerals of reference marked thereon, to be a full, clear, and exact description of the same, and which said drawings constitute part of this specification, and represent, in—

Figure 1:
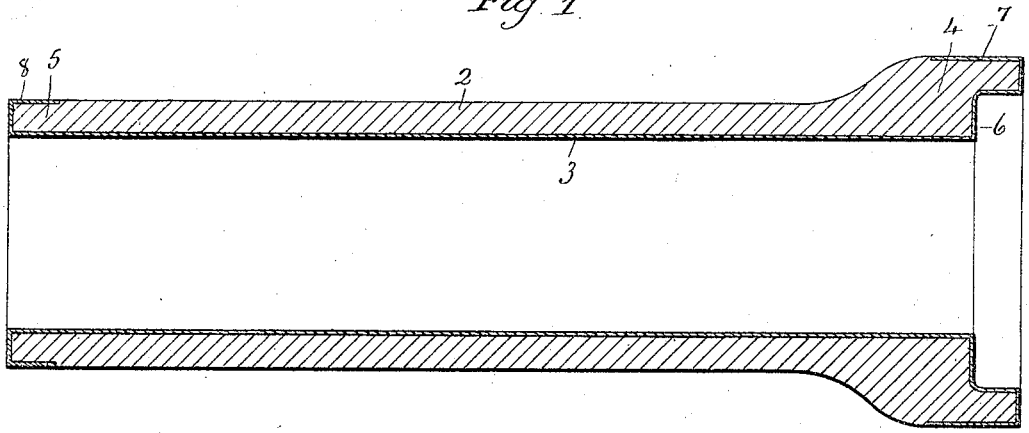
Figure 2:
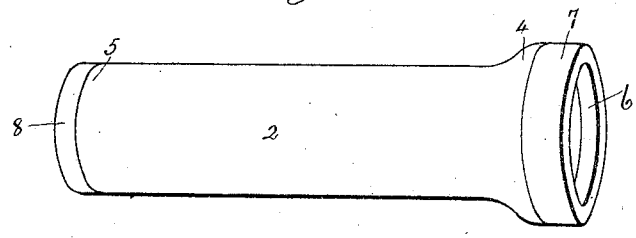

Figure 1, a view in vertical longitudinal section of a cement pipe constructed in accordance with my invention; Fig. 2, a perspective view thereof.

My invention relates to an improvement in sheet-metal-lined cement pipes, the object being to strengthen and protect them at their ends without markedly increasing their cost.

With these ends in view my invention consists in a sheet-metal-lined cement pipe.

My invention further consists in a sheet-metal-lined cement pipe having certain details of construction and combinations of parts, as will be hereinafter described, and pointed out in the claims.

In carrying out my invention, as herein shown, the pipe consists of a cement tube 2, formed upon a sheet-metal lining 3. For facility in being coupled together these pipes are each formed with an enlarged socket end 4 and a spigot end 5, the socket end of each pipe receiving the spigot end of the adjoining pipe and the spigot end of each pipe being entered into the socket end of the adjoining pipe at the other end. At the socket end of the pipe the sheet-metal lining 3 is bent radially outward and then forward to form a shallow socket 6 and then radially outward and then longitudinally inward to form a ferrule 7, into which the cement is entered and which when the pipe is completed incloses, strengthens, and protects the cement at the socket end of the pipe. At the spigot end 5 of the pipe the sheet-metal lining 3 is bent radially outward and then longitudinally inward to form a ferrule 8 to inclose, strengthen, and protect the cement at the spigot end of the pipe. In other words, under my invention the ends of the sheet-metal lining of the pipe are bent radially outward and longitudinally inward toward each other to form ferrules, which in turn create annular pockets or chambers for the reception of the cement at the ends of the pipe structure.

It will be observed that in applying the cement it is made flush with the outer surface of the ferrules 7 and 8, which are thus virtually embedded in it.

Having fully described my invention, what I claim as new, and desire to secure by Letters Patent, is—

1. As a new article of manufacture, a cement pipe having a sheet-metal lining shaped at its ends to form ferrules for the protection of the cement at the ends of the pipe, the said pipe consisting of a cement tube and a sheet-metal lining the ends of which are turned radially outward and then longitudinally inward toward each other to form ferrules to inclose and protect the ends of the cement tube.

2. As a new article of manufacture, a cement pipe having a sheet-metal lining shaped at its ends to form ferrules for the protection of the cement at the ends of the pipe, the said pipe consisting of a cement tube and a sheet-metal lining which at the spigot end of the pipe is bent radially outward and then longitudinally inward to form a ferrule to inclose and protect the cement at the spigot end of the pipe, and which at the socket end of the pipe is bent outward and forward to form a socket and outward and longitudinally inward to form a ferrule to inclose and protect the cement at the socket end of the pipe.

In testimony whereof I have signed this specification in the presence of two subscribing witnesses.

JAMES H. MACDONALD.

Witnesses:
FRANK S. HOYT,
EUGENE H. KELSEY.